United States Patent [19]

Neumann

[11] Patent Number: 4,745,834
[45] Date of Patent: May 24, 1988

[54] CROSS CUTTING GUIDE FENCE AND GAUGE MEANS FOR RADIAL ARM SAWS

[76] Inventor: Arthur M. Neumann, 28 Dukes La., Lincolnshire, Ill. 60015

[21] Appl. No.: 917,096

[22] Filed: Oct. 8, 1986

[51] Int. Cl.$^4$ .............................................. B27B 5/20
[52] U.S. Cl. .................................... 83/468; 83/471.3; 83/522
[58] Field of Search .................... 83/468, 522, 467 R, 83/471.2, 471.3

[56] References Cited

U.S. PATENT DOCUMENTS

| | | | |
|---|---|---|---|
| 2,747,625 | 5/1956 | Small | 83/468 |
| 2,850,058 | 9/1958 | Stoll | 83/468 X |
| 3,807,269 | 4/1974 | Mertes | 83/468 |
| 4,077,290 | 3/1978 | Hreha | 83/471.2 |
| 4,111,088 | 9/1978 | Meyer | 83/468 X |
| 4,111,409 | 9/1978 | Smith | 83/467 R X |
| 4,256,000 | 3/1981 | Seidel | 83/468 |

Primary Examiner—Donald R. Schran
Attorney, Agent, or Firm—Hill, Van Santen, Steadman & Simpson

[57] ABSTRACT

A cross cutting guide fence and gauge for radial arm saws comprises a bar member to be mounted in a conventional transverse saw table slot. An upwardly opening saw blade clearance kerf extends transversely across the member. Sawn length gauging scales on display panels are carried by the bar at opposite sides of the clearance kerf and are longitudinally adjustable. For accurate duplicatively gauging the length of fixed length sawn workpieces, a replaceable gauge block may be selectively adjustably longitudinally mounted on the front face of the bar at either side of the kerf.

3 Claims, 2 Drawing Sheets

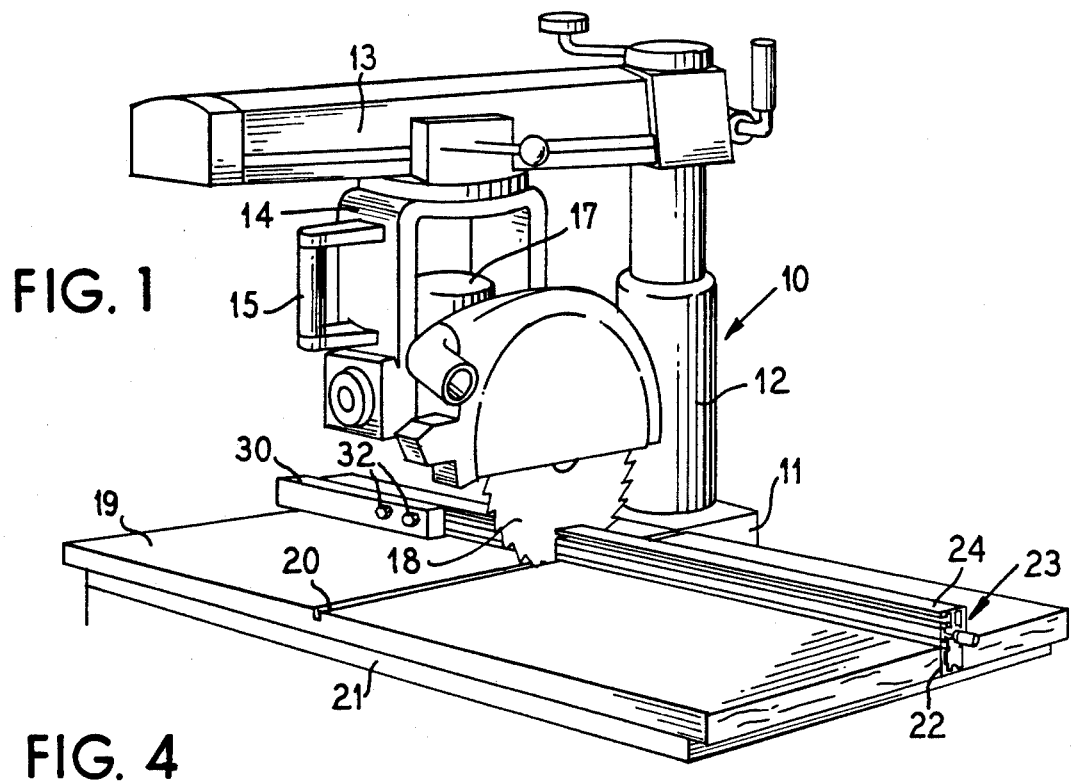
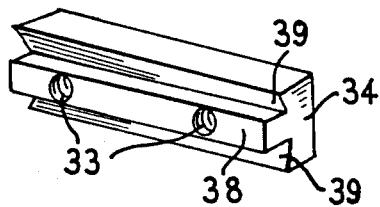
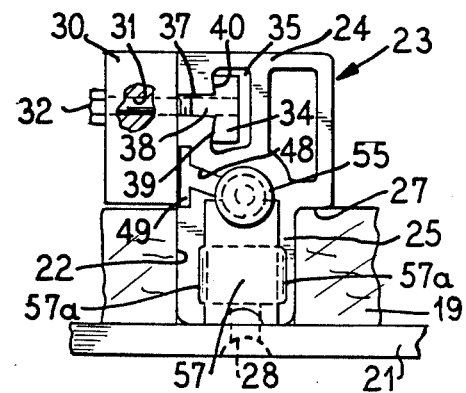
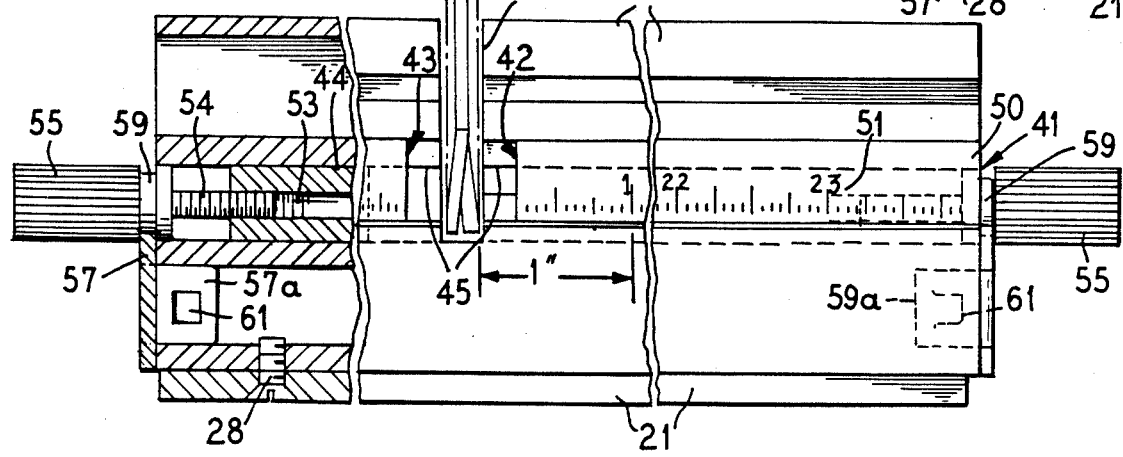

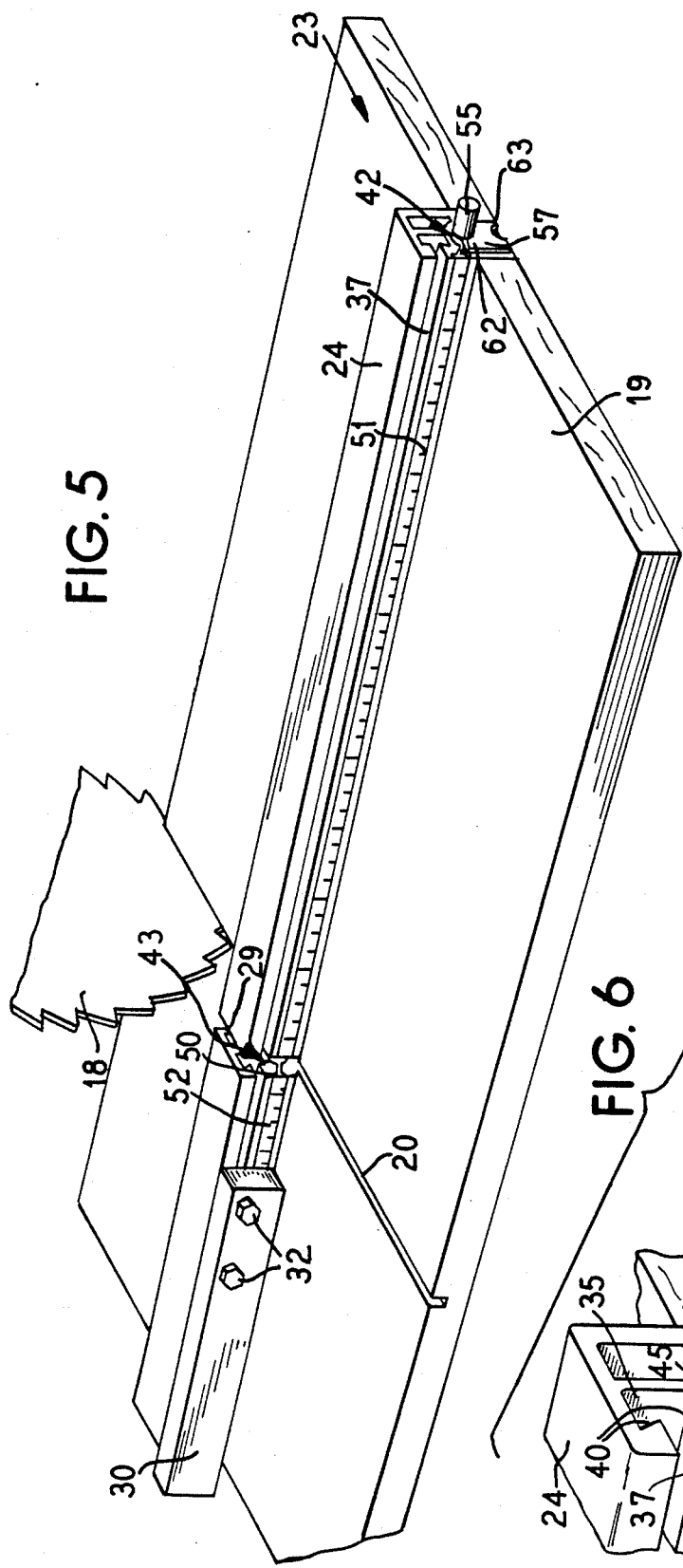

CROSS CUTTING GUIDE FENCE AND GAUGE MEANS FOR RADIAL ARM SAWS

BACKGROUND OF THE INVENTION

This invention relates to the art of power saws, and is more particularly concerned with new and improved guide fence means for cross cutting radial arm saws.

Saws of this kind are conventionally equipped with a so-called guide fence comprising a bar that extends from side-to-side of the cutting table of the saw machine and against which a workpiece, such as a board, is held when making a cut. Customarily, the part to be cut is marked, and the saw blade is lined up with the mark on the workpiece to make the cut. Even an experienced sawer can be at least slightly off in the saw blade alignment with the guide mark on the workpiece. As a result, it has been difficult to attain consistently accurate results, especially where duplicate sawn pieces are to be provided successively or at spaced times.

SUMMARY OF THE PRESENT INVENTION

An important object of the present invention is to provide a new and improved cross cutting saw guide fence and guaging means for attaining accurate cuts.

Another object of the invention is to provide a new and improved cross cutting saw guide fence gauging means permitting substantially micrometer adjustments for cutting accuracy and which is adapted for accurate resetting for uniform repetitive results.

A further object of the invention is to provide a new and improved guide fence of the general character indicated which is simple in structure and operation and rugged and durable for the intended purpose.

Yet another object of the invention is to provide a new and improved guide fence having means for attaining precise duplicative cutting.

The present invention provides a radial arm cross cutting saw guide fence and gauging means, comprising an elongated guide fence member having means for mounting the member on a saw table. An upwardly opening saw blade clearance kerf extends transversely across the member, and gauging means on a face of the fence member are so related to the kerf as to gauge the length of a workpiece to be cut. The gauging means comprise primarily an adjustable scale means on the fence member face.

BRIEF DESCRIPTION OF THE DRAWINGS

Other objects, features and advantages of the invention will be readily apparent from the following description of representative embodiment thereof, taken in conjunction with the accompanying drawings, although variations and modifications may be effected without departing from the spirit and scope of the novel concepts embodied in the disclosure and in which:

FIG. 1 is a perspective view of a representative radial arm cross cutting saw showing the guide fence of the present invention in use therewith;

FIG. 2 is an enlarged end elevational view of the guide fence of the present invention;

FIG. 3 is a fragmental front elevational view of the saw table and guide fence shown in FIG. 1;

FIG. 4 is a perspective view of the retaining clamp nut for the optionally usable stop bar arranged to be mounted on the guide fence;

FIG. 5 is an enlarged perspective view of the saw table and guide fence assembly; and FIG. 6 is a fragmentary assembly view showing details of the scale adjusting means for the guide fence.

DETAILED DESCRIPTION

A cross cutting radial arm saw 10 (FIG. 1), representative of saws of this kind, comprises a base 11 which may be supported on any suitable frame or stand (not shown) and comprises an upright column carrying a radial arm 13 supporting a motor yoke 14 having a front handle 15 by which the yoke and motor 17 and rotary saw blade 18 can be manipulated in a cross cutting direction from rear to front over a saw table 19 having a front to rear slot or kerf 20 to accommodate and clear the saw teeth when making a cut. The saw table 19 is supported on means such as a suitable anvil shown schematically as a plate 21.

Transversely across the rear portion of the table 19, there is a slot 22 within which is mounted a guide fence 23. Conventionally, guide fences have consisted of a wooden bar against which a marked piece to be cut is held while the saw is operated to make the cut. As disclosed herein, however, the guide fence 23 embodying the present invention provides not only a new and improved construction of the guide fence member itself, but also new and improved gauging means for accurately cutting an unmarked workpiece. Such accuracy is attainable successively or duplicative.

In a preferred construction, the guide fence 23 comprises a one-piece bar 24, desirably constructed as a hollow elongated aluminum extrusion of a length to extend from side-to-side on the table 19 and anchored in the guide fence channel or slot 22. Extending along the lower side of the bar 24 is a relatively wide coextensive rib 25 of a width to fit within the slot 22. An overhanging stop shoulder 27 along the rear side of the bar 24 rests on the table 19 and assures that the main body of the bar 24 will be at a uniform height in spite of variations in thickness of the table 19 of various saw installations with which the guide fence 23 may be used.

Anchoring of the bar 24 in place on the table 19 may be effected in any suitable manner, and merely by way of example, screws 28 are shown as bolting or screwing the bar fixedly, but replaceably in place with respect to the anvil plate 21. It will be appreciated, of course, that with different saw makes different means for securing the guide fence may be provided.

For clearance of the saw blade 18, the bar 24 is provided with a transverse upwardly opening slot or kerf 29 (FIG. 3) which is of a depth equal to the depth of the saw table kerf 20, and is of a sufficient width to assure free movement of the saw blade therethrough in cutting and retraction strokes.

New and improved gauging means are provided on the front face of the bar 24. In one aspect the gauging means comprises an optional device for duplicative cutting with precision, that is, to attain the same length for a plurality of pieces to be cut to the same length in immediate successions. For this purpose, an elongated stop member, gauge bar or block 30 (FIGS. 1, 2 and 5) and means for adjustably mounting the gauge bar along the front face of the fence bar 24. In a convenient, efficient mounting structure, the stop block 30 is of elongated form and has a pair of longitudinally spaced bolt holes 31 extending in front to rear direction and through which the shanks of bolts 32 extend and are threaded into corresponding tapped bores 33 in an elongated generally T-shape cross section clamp or nut member 34 (FIGS. 2 and 4) received within a longitudinally extending complementary generally T-shaped channel 35 (FIGS. 2, 5 and 6) in the bar 24. A longitudinal slot 37 along the front of the bar 24 communicates with the channel 35. A rib 38 along the front of the T-nut 34 fits slidably in the slot 37. In order to avoid spreading of the tightened gripping surfaces of the T-nut 34 and the bar 24 along the slot 37, the T-nut is provided with oblique convergently related gripping surfaces 39 which engage complementary fixed surfaces 40 of the bar 24 along the slot 37. Thereby, after the stop block 30 has been adjusted as desired lengthwise along the fence bar 24, and the T-nut 34 tightened, the stop block will be held with utmost firmness against inadvertent dislodgement from the adjusted position. For increasing the adjustment range of the block 30, the bolt holes 31 are located closer to one end of the block 30 than to the other end of the block.

Primary gauging means are provided along the front of the guide fence bar 24, comprising adjustable scale means 41. In an efficient arrangement, two elongated scale carriages are provided, namely, a scale carriage 42 in the right hand portion of the bar 24 having regard to the kerf 29, and a scale carriage 43 in the portion of the bar 24 at the left of the kerf 29 (FIG. 3). The carriages 42 and 43 may be substantially similarly constructed except that in order to accommodate the variation in length of the fence bar 24 corresponding to variation in length of the table 19 at each side of the table kerf 20, the carriage 42 in this instance is longer than the carriage 43.

As best seen in FIGS. 2, 3 and 6, each of the carriages 42 and 43 has a generally cylindrical body 44 which is received slidably in a complementary longitudinal bore 45 in the bar 24. Thereby, the carriages are individually longitudinally slidably adjustable relative to the bar 24.

Extending laterally from the cylindrical body 44 is a longitudinal fin 47 which is slidable in a complementary slot 48 extending the length of the bore 45. At the outer end of the slot 48, there is a groove 49 within which is slidably received a panel flange 50 integral with the fin 47 and facing forwardly and serving as an adjustable gauging scale display panel carrying thereon a calibrated scale 51 for the carriage 42 and a calibrated scale 52 for the carriage 43. Desirably, the scale surface of the panel 50 on each of the carriages is slightly recessed back of the adjacent front surface of the bar 24 so that the scale will not be rubbed off by wood pieces positioned against the guide fence in use. Conveniently, the scales 51 and 52 may be silk screened on the display panel faces, although other modes of applying the scales may be utilized, such as etching, stamping, applying a preprinted panel, or the like. By way of example, the scale 51 may be 24" long extending rightwardly from ¼" from the right side of the saw blade 18 at the kerf 29. For clearance purposes, the inner end of the panel 50 terminates ¼" from the side of the blade and, therefore, to compensate, the scale calibration from the inner end of the carriage, in this instance 1" from the blade side, is shortened by ¼".

Conformable to the left hand carriage 43, the scale 52 may be 14" long starting from the left hand face of the blade 18 with a nominally ¼" gap between the end of the scale and the side of the blade and with the scale numbering starting at 1" adjacent to the kerf 29 and extending leftward.

In order to attain accurate, fine adjustment of the scales 51 and 52 with respect to the relative position or thickness of the saw blade 18, each of the carriages 42 and 43 is provided with micrometer adjustment means. For this purpose, the outer end of each of the cylindrical carriage bodies 44 has a tapped bore 53 (FIGS. 3 and 6). A threaded stem 54 of a knob 55 is threaded into the bore 53. To permit the knob 55 to be turned while being held against axial displacement, a yoke 57 is provided having at least one yoke cradle 58 slidably engaged within an annular groove 59 in the inner end portion of the knob 55.

The yoke 57 is constructed to be fixedly assembled with the associated outer end of the bar 43 by means here comprising of anchoring wings 57a dimensioned to be received within socket ends of a hollow longitudinally extending channel 60 in the guide fence bar rib 25. Each of the anchoring wings 57a has a laterally and outwardly biased retaining finger 61 which, upon the wings 57a being pressed into position within the end socket of the channel 60 bites into the respective opposing side wall defining the channel. This holds the yoke 57 positively in place. Upstanding flange portion 62 and downwardly extending flange portion 63 on the yoke 57 serve as stops against the adjacent end of the rib 25. Through this arrangement, and by having the screw shanks 54 provided with 32 threads per inch, one turn of the screw by means of the knob 55 will adjust the scale 1/32". This adjustment can be effected from either end of the guide fence 23.

In use, after the scales 51 and 52 have been accurately adjusted, cutting of desired lengths of sawn pieces can be selectively obtained by holding the board to be cut against the face of the guide fence 23 with a cut end of the board aligned with the scale indicia corresponding to the length of the sawn piece desired. Then the saw blade 18 is operated to cut the board. For longer sawn pieces, the scale 51 may be used. For shorter sawn pieces, the scale 52 may be used. Since the front face of the guide fence 23 may be unobstructed throughout its length, absent the stop block 30, it is possible to cut off longer pieces than the length of either of the scales 51 or 52 by a simple arithmetical multiplication. For instance, if a sawn piece longer than 23" is desired, the length greater than 23" is simply added to the length of piece to extend beyond the 23" scale, and then with the board held against the face of the guide fence, the saw 18 maneuvered to effect the cut. On the other hand if more convenient, the scale 52 is used, the same procedure may be effected, that is the board extended beyond the scale 52 to the extent desired and with the board held against the face of the guide fence 23 a piece of desired length cut off.

Where duplicate pieces are to be cut, assured duplicative accuracy is attained by mounting of the guage stop block 30 on the fence bar 24 at either side of the blade 18 in desired adjusted position and tightened in place by means of the T-nut 34. By virtue of its replaceability, it is a simple matter to transfer the guage block 30 from one scale orientation to the other, simply by loosening the nut 34 and sliding the assembly from one end of the bar 24 and sliding the assembly into place on the other end of the bar 24 and retightening the nut 34 after the desired adjustment position of the block 30 has been attained. The scales 51 and 52 greatly facilitate accurate adjustment of the block 30 for its function.

It will be understood that variations and modifications may be effected without departing from the spirit and scope of the novel concepts of the present invention.

I claim as my invention:

1. A radial arm cross cutting guide fence and gauging assembly, comprising:
- a guide fence bar made of an aluminum extrusion having a front face side, an upper portion and a lower portion, each with a back side;
- means for mounting said guide fence on a radial arm saw table top including a slot cut into said table top for receiving said guide fence lower portion;
- an upwardly opening saw blade clearance kerf extending transversely through said guide fence;
- a gauge extending along said guide fence bar including a rectangular panel and a tubular carrier pole attached to said panel;
- a channel for receiving said gauge extending along said guide fence bar front face including a tubular channel for receiving said tubular pole and a recess in said front face for receiving said panel, said recess communicating with said tubular channel; and
- means for adjustably securing said gauge within said guide fence bar including anchor wings securable at ends of said gauge by a micrometer adjustment screw for moving said gauge longitudinally relative to said guide fence and means located on said anchor wings for engaging walls of a channel located in said lower portion of said guide fence bar to prevent longitudinal displacement of said screw while permitting rotary adjustment of said screw.

2. A radial arm cross cutting guide fence and gauging assembly, comprising:
- an elongated guide fence bar having a front face, an upper portion and a lower portion, each with a back side;
- means for mounting said guide fence on a saw table including a slot cut into said saw table for receiving said guide fence lower portion;
- an upwardloy opening saw blade clearance kerf extending transversely through said guide fence;
- an overhanging stop shoulder extending along said guide fence upper portion back side and resting upon said saw table to prevent said guide fence from extending fully into a saw table slot having a depth greater than a height of said lower portion;
- a T-shaped channel extending along a front face of said upper portion;
- a gauge stop block;
- means for slidable mounting said stop block relative to said channel including a T-shaped carrier block slidably disposed within said T-shaped channel to which said gauge stop block is releasably secured so as to releasably secure said stop block against said guide fence bar face side; and
- means for accurately engaging a length of a workpiece to be cut located at the front face of said guide fence upper portion and related to said clearance kerf.

3. A radial arm cross cutting guide fence and gauging assembly as set forth in claim 2, wherein said means for slidable engaging said stop block comprises a T-nut and bolts extending through said stop block into said T-shaped channel and secured in said T-nut.

* * * * *